United States Patent [19]

Grisham

[11] Patent Number: 5,201,553
[45] Date of Patent: Apr. 13, 1993

[54] PIPE CONNECTOR FOR WASHING MACHINE DRAINAGE

[76] Inventor: William T. Grisham, 313 Westburg Ave., Huntsville, Ala. 35801

[21] Appl. No.: 958,831

[22] Filed: Oct. 9, 1992

[51] Int. Cl.⁵ .............................................. F16L 25/00
[52] U.S. Cl. ................................... 285/177; 285/379; 285/423
[58] Field of Search ...................... 285/177, 7, 8, 379, 285/423

[56] References Cited

U.S. PATENT DOCUMENTS

| | | |
|---|---|---|
| 214,991 | 5/1979 | Coler . |
| 2,025,067 | 12/1935 | Miller . |
| 2,051,211 | 8/1936 | Hayopion ................... 285/177 X |
| 2,778,390 | 1/1957 | Young, Jr. . |
| 3,148,895 | 9/1964 | Jasper et al. . |
| 3,680,896 | 8/1972 | Cupit . |
| 3,913,928 | 10/1975 | Yamaguchi . |
| 3,998,478 | 12/1976 | Zopfi . |
| 4,293,138 | 10/1981 | Swantee . |
| 4,410,004 | 10/1983 | Kifer et al. . |
| 4,440,406 | 4/1984 | Ericson ................... 285/177 X |
| 4,547,005 | 10/1985 | Soederhuyzen . |
| 4,758,027 | 7/1988 | Todd . |
| 4,779,904 | 10/1988 | Rich . |

FOREIGN PATENT DOCUMENTS 1537833 8/1968 France ........................... 285/177

Primary Examiner—Dave W. Arola

[57] ABSTRACT

A washing machine drain hose connector for coupling the discharge hose pipe to a sewer drain pipe is made of pliable, elastomeric material. The connector shape is a staggered, coaxial series of cylindrical sleeve sections connected end to end by integrally molded annular shoulders. The cylindrical sleeve radii increase progressively along the sequence of joined sleeve section. A largest sleeve section is folded back over the next-to-largest sleeve section to frictionally grip the drain pipe on both its inside and outside surfaces. The smaller sleeve sections grip various standard sizes of washing machine discharge hose pipes inserted into the drain pipe. All sleeve sections are sized to interfere, so that they are stretched around the pipes and exert friction forces to hold the pipes in coupled relation. To increase the frictional holding force, the sleeve sections (except the largest) are all at least as long as the sleeve radius, the sleeve walls are smooth (i.e., without ribs or other protrusions), and the sleeve walls are thin enough that they can roll over and become wedged in the space between the pipes when water back pressure tends to blow the hose pipe out of the drain pipe.

13 Claims, 1 Drawing Sheet

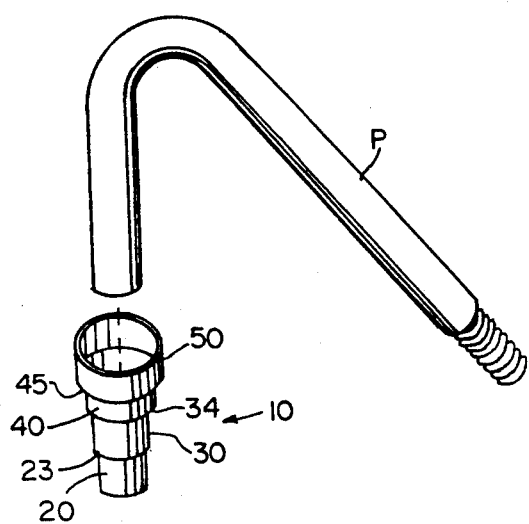
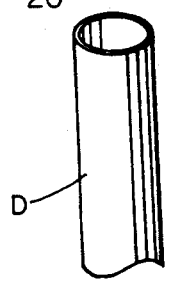
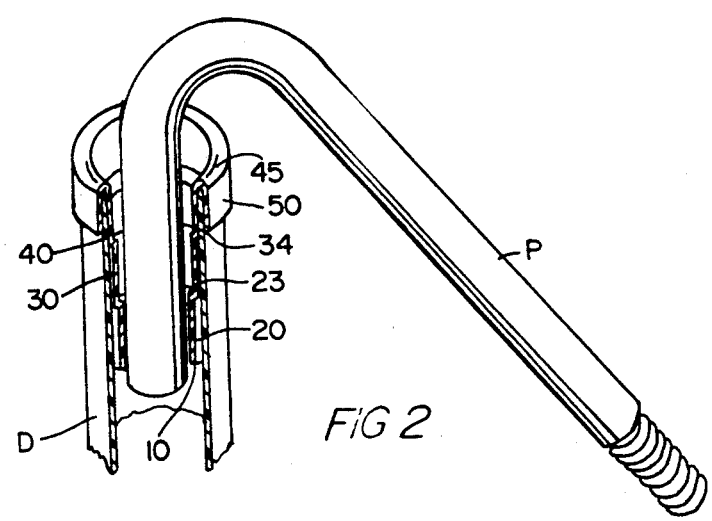
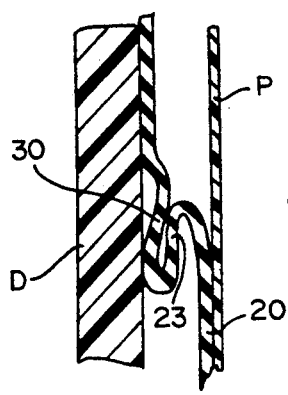

PIPE CONNECTOR FOR WASHING MACHINE DRAINAGE

BACKGROUND OF THE INVENTION

1. Technical Field

The present invention relates to elastomeric or rubbery pipe connectors for coaxially joining a pair of rigid pipes having two different diameters, and making the joint in such a manner as to be readily dis-assembled and leak-proof. The connector has particular utility in joining the drain pipe or hose of a washing machine to a standpipe or the like.

2. Discussion of the Prior Art

Washing machines typically provide for draining of the wash water by including a flexible hose with a section of rigid pipe attached at the discharge end of the hose. This typically U-shaped ("goose neck") hose pipe, usually having a diameter of somewhat more than an inch, is inserted into the open end of a vertical length of drain pipe connected to storm sewers. The drain pipe diameter (typically either 2-inch or 1 and ½-inch PVC) is larger than the diameter of the discharge hose pipe, so the hose pipe can be inserted into the drain pipe without interference and rest therein under the influence of gravity.

The goose neck hose pipe is shaped so that the discharge end rests several inches down inside the drain pipe. When the washing machine pumps water out through the hose, the water usually runs easily down the drain pipe; accordingly, no fluid seal between the hose pipe and the drain is provided by the manufacturers. There is nothing to hold in the hose pipe in the drain, except gravity.

However, the velocity of the water discharged from the end of the hose pipe into the drain pipe is sometimes so high that reaction forces, caused by the downward blast of water, lift up the hose and blow the hose pipe right out of the drain pipe, resulting in a flooded floor. Problems also occur when the water discharge speed is not great enough to lift the hose by reaction, but the drainage is inefficient. In this case, back pressure added to the reaction force can force the hose out of the drain pipe, or, the hose pipe may stay in the drain pipe but the water backs up and overflows.

To alleviate these problems, washing machine installers devise connectors from makeshift clamps, cable ties, etc. None of these jury-rigged connections is practical, and the washing machine blow-out/overflow problem remains unsolved.

The common use of an outlet box does not offer a solution. Kifer et al., in U.S. Pat. No. 4,410,004, describe a laundry drain outlet box having a connector at its bottom capable of fitting two common sizes of drain pipe, or "tail pipe". The connector fits one size internally and the other size externally. There is no means provided for preventing blow-out or of holding the hose pipe in the drain pipe.

In the prior art, connectors or adapters made of resilient material have been used for joining rigid pipes.

U.S. Pat. No. 3,913,928 (Yamaguchi) discloses a resilient connector for coaxially joining different-size pipes. The smaller pipe is inserted into the larger when the joint is made. Yamaguchi's connector comprises a generally tube-like annular cylindrical section adapted to fit between the two joined pipes in the overlap region: that is, the connector is of such internal and external diameters that it presses against the inside of the larger pipe and the outside of the smaller pipe in the region of overlap. The connector has annular ribs or fins, on both the internal and external cylindrical surfaces, to seal against fluid leakage between either pipe and the connector.

Ribs, flanges, annular sawtooth ridges, and the like, are often molded into pipe fittings for sealing. Separate gaskets are also used, as shown in U.S. Pat. No. 2,778,390 (Young).

U.S. Pat. No. 3,998,478 (Zopfi) and U.S. Pat. No. 4,293,138 (Swantee) teach connectors that are very similar to the Yamaguchi connector. Zopfi employs only internal ribs leaving the outside of the connector smoothly cylindrical.

In U.S. Pat. No. 3,680,896 (Cupit) there is disclosed a series of ribs or serrations molded into a flexible connector used for coupling water closets to sewer pipes. The disclosed toilet bowl connector has two ribbed sections of different diameters, joined at their ends. In one embodiment, Cupit discloses a doubly smooth-walled cylindrical section of resilient tubing for sealing against a pipe, there being no ribs on either the inside or outside surfaces. The end of the unit is connected to an accordion diaphragm. The length of the smooth-walled section is just under 0.8 times the radius of the section (as measured in drawing FIG. 3).

A "sealing sleeve" for water closet installation is disclosed in U.S. Pat. No. 4,547,005 (Soederhuyzen). The Soederhuyzen connector has two coaxial tubular sections of different diameters the smaller diameter having external ribs, the larger one having internal ribs. (One embodiment lacks the internal ribs.) Attached to the end of the distal larger section is the thin-walled, cylindrical sealing sleeve configured without surface ribs. The sealing sleeve is attached by an annular bridge to the larger section. The device is molded in one piece.

The smooth-walled sleeve has an internal diameter equal to the internal diameter of the smaller section. The sleeve is inverted and disposed within the larger section, so that its end distally of the bridge aligns with the end of the smaller section where it attaches to the larger section. In use, a toilet bowl outlet pipe is inserted into the sealing sleeve; the outlet pipe is thus also disposed within the larger thick-walled sections, surrounding the inverted sealing sleeve. The space between the sealing sleeve and the larger section is empty, and no part of the connector touches the inside of the outlet pipe.

The function of Soederhuyzen's sealing sleeve is not immediately clear from the patent. Soederhuyzen apparently relies upon the differential in wall thickness between the larger section and the sealing sleeve for the proper functioning of his invention, which is directed toward ease of toilet bowl installation. The material of which the connector is molded is specified to be "resilient", but the only material named as suitable is polyethylene, a relatively rigid plastic.

U.S. Pat. No. 3,148,895 (Jasper et al) discloses a connector for coupling vacuum cleaner hoses onto the cleaner body. The connector has a triple-wall construction with the outer skin being vinyl and the interior filled with a "soft squashy substance" like sponge rubber. The outside surface is cylindrical with ribs, and the inside has a stepped series of concentric cones with special indents adapted for vacuum hoses.

U.S. Pat. No. 4,779,904 (Rich) teaches a stepped series of concentric cylindrical sections used in a connector for vehicle tail pipes. The cylindrical sections have ribs for internally sealing an exhaust conduit.

U.S. Pat. No. 214,991 (Coler) discloses a flexible connector made of rubber for coaxially joining two differently-sized pipes. The smaller pipe is disposed within the larger pipe in an overlap region. The rubber connector includes a tubular section of such internal and external diameters that, in the overlap region, it fills the space between them. This interstitial tube section extends along the outside of the smaller pipe, beyond the overlap region, a distance about equal to the overlap distance. The end of the larger pipe is thus disposed near the middle of the length of the rubber tube section. A bridge or annular flange extends radially outward from the rubber tube at this point, joining the tube to a second, larger rubber tube surrounding the larger pipe along the overlap and the interiorly disposed interstitial length of the smaller rubber tube. The inner tube, the bridge, and the outer tube are all one molded piece. The larger pipe is gripped both on the inside (by the outside surface of the inner tube) and on the outside (by the inside surface of the outer rubber tube). The surface bearing against the pipes are smooth, i.e., without ribs.

In U.S. Pat. No. 4,758,027 (Todd) there is disclosed a cylindrically symmetrical member consisting of a stepped series of tube sections. It is easily molded because there are no protrusions, and it appears to be made of rigid or semi-rigid materials.

U.S. Pat. No. 2,025,067 (Miller) shows a funnel-like device for filling auto gas tanks. One of the embodiments is made of resilient material. The device has a tube adapted to be inserted into the gas tank inlet pipe, and has at its upper end a series of ribs, all coaxial or concentric with the tube. The internal diameters of the ribs increase with distance from the upper end of the tube, so that any of various standard sizes of gas pump nozzles may be inserted and form a fluid seal with the particular rib matching its outer diameter.

The above references do not disclose a connector adapted for use as a washing machine drain connection. Specifically, none of the connectors described above is directed toward coupling a washing machine discharge hose pipe to a sewer drain pipe, and none is directed primarily toward preventing blow-out or separation of the joined pipes. First, many of the disclosed devices place ribs, flanges, or bands against the pipe surfaces instead of smooth cylindrical surfaces of significant length. The ribs are intended to increase the fluid sealing capability of the connectors; however, fluid sealing is a secondary consideration in a washing machine hose pipe connection where blow-out prevention is the main goal. In order for a elastomeric tube to best grip a pipe, the surface contact area should be a maximum; this implies that the gripping surface must be smooth, not ribbed. Second, the cylindrical gripping sections of the known connectors are short, again decreasing the surface area and reducing the gripping force. Third, the connectors known previously depend upon only friction to grasp the connected pipes; they use no method of increasing the force beyond that caused by the mere initial assembly.

OBJECTS AND SUMMARY OF THE INVENTION

It is therefore a primary object of the present invention to provide a pipe connector for maximizing pipe engagement forces to prevent blowout of one pipe from the other due to back pressure and reactive forces.

It is another object to provide such pipe connector configured to seal against fluid leakage at the connection site.

It is yet another object to provide such pipe connector in a configuration that is simple and inexpensive to manufacture.

In accordance with the present invention, an adapter or connector utilizes the high coefficient of friction of elastomeric or rubber material against the surfaces of a drain pipe and a washing machine discharge hose pipe to positively resist separation of the pipes and prevent washing machine hose pipe blow-out. The connector of the present invention includes smooth-walled tubular sections in the form of right cylinders of different diameters, herein denoted as sleeves, joined by annular shoulders at their respective ends to form a stepped sequence of monotonically increasing diameter. To simplify manufacture and to maximize frictional engagement, the sleeve sections have no internal or external ribs. In this regard, "smooth-walled", as used herein, is taken to mean that the wall is uninterrupted by ribs, serrations, protrusions, or the like. The sleeve sections have respective internal diameters chosen for gripping various common sizes of washing machine discharge hose pipes or sewer drain pipes.

The smallest sleeve section has an internal diameter adapted to grip the hose pipe from the washing machine. The two largest sleeves are designed to grip the larger drain pipe into which the hose pipe is inserted; one lies against the inside surface of the drain pipe, and the other (the sleeve section of greatest diameter) is folded back to surround the outside of the drain pipe so that the outer sleeve section surrounds the inner one. These two sleeve sections are connected by a bridge at the top end of the connector.

The ratio of length to radius for each cylindrical sleeve section or sleeve is at least 0.8, and for all but the largest, folded-back sleeve section exceeds 1.0. The high length to radius ratios increase the friction force of the sleeve sections on the gripped pipes.

The inside and outside diameters of the various sleeve sections are determined by the diameters of the pipes they are to grip. The wall thickness is chosen so that, if the hose pipe starts to blow out of the drain pipe, and the smaller stepped sleeve sections begin to invert and roll back onto themselves, then the total thickness of doubled-up tubular sleeve sections becomes greater than the space between the two pipes, whereby the sleeve sections become wedged in that space and prevent blow-out. The connector may be integrally molded of material soft and pliable enough so that the tubular sleeve sections are capable of both frictionally gripping the pipes and becoming wedged in the space between the pipes.

BRIEF DESCRIPTION OF THE DRAWINGS

The above and still further objects, features and advantages of the present invention will become apparent upon consideration of the following detailed description of a specific embodiment thereof, particularly when considered in conjunction with the accompanying drawings wherein like reference numerals in the various figures are utilized to designate like components, and wherein:

FIG. 1 is an exploded view in perspective of the connector of the present invention and a washing machine hose pipe and sewer drain pipe to be coupled;

FIG. 2 is a view in perspective and partial section of the connector of the present invention connected between the sewage drain pipe and a washing machine hose pipe; and FIG. 3 is a detailed view in section of a portion of the assembled pipes and connector, showing rolling of the connector walls under an axial force tending to separate the pipes.

DESCRIPTION OF THE PREFERRED EMBODIMENTS

Referring specifically to FIGS. 1 and 2, a washing machine drain hose terminates in a bent "goose neck" hose pipe P adapted to be disposed in a sewer drain pipe D located below pipe P. A connector 10, is configured as a stepped series of cylindrical sleeve sections serving to join the two pipes P, D and to prevent them from easily separating, while sealing the joint against leakage. Connector 10 is preferably molded, as a single piece of soft, pliable, resilient elastomeric material, such as, for example, neoprene, capable of frictionally gripping pipes P and D. The tubular sleeve sections 20, 30, 40, 50 are coaxial right cylinders and are joined to one another by annular shoulders 23, 34, 45 connecting their respective ends. The configuration of sleeve sections is described herein as "staggered", meaning that they are joined by the annular shoulders only at their ends, not along their lengths. The diameter of each sleeve section is unique, and their diameters change monotonically along the configuration sequence from one sleeve section to the next.

Sleeve 50, the largest in radius, is folded through 180° back over sleeve 40. All of the other sleeve sections 20, 30, and 40 are disposed in successive axial locations in a stepwise configuration. "Stepwise" herein means that the sleeve sections are not folded or doubled back, but progress in axial position in the same sense as their diameters progress; in longitudinal section such a configuration resembles steps.

The preferred embodiment has a substantially constant wall thickness of 0.062 inches in sleeve sections 30, 40, and 50, and 0.075 inches in the smallest sleeve 20. Sleeve section 20 has an internal radius of 0.523 inches. A standard 1 and 1/16-inch outside diameter hose pipe P may be inserted into it; the slight interference of about 0.01 inches all around causes the sleeve section 20 to be stretched and to grip hose pipe P.

Sleeve section 20 at its upper end is joined to the next larger sleeve section 30 by the annular shoulder 23. Sleeve section 30 has an internal radius of 0.650 inches to grasp the next larger standard size of hose pipe P, which has an outside diameter of 1 and 5/16 inches. If this size of washing machine hose pipe P is used, it can be inserted to shoulder 23, or sleeve section 20 may be cut off and pipe P inserted to extend past the end of sleeve 30.

The next sleeve section 40 in the sequence is joined to sleeve section 30 by annular shoulder 34. Sleeve section 40 has an external radius of 0.800 inches to grasp the inside of the drain pipe D, which is typically standard PVC piping having an inside diameter of 1 and 9/16 inches (internal radius=0.781 inches). Sleeve section 40 is circumferentially compressed when inside PVC pipe D.

Alternative embodiments of the invention may have more or fewer similar sleeve sections disposed in the stepwise configuration.

A third annular shoulder 45 joins sleeve section 40 to sleeve section 50 which is folded back to surround sleeve section 40. The radially inward facing surface of sleeve section 50 grasps the outside of drain pipe D. The preferred inside radius of the sleeve section 50 is 0.938 inches, very close to the outside radius of the 1 and ⅞ inch outside diameter pipe D.

One of the preferred materials for connector 10 is a plastic molding material sold under the trade name "Alcryn" by the du Pont corporation. Alcryn 2070BK and Alcryn 2070NC are both suitable grades. These Alcryn compounds have a Shore A durometer hardness of 70, a tensile strength of 1200 psi, and a flexural modulus of 1200 psi. These materials stretch to 290% of original length before breaking. At room temperature, they retain a permanent set of 18% in compression and 9% in tension after twenty-two hours of strain. They swell 9% after 7 days in boiling water and are rated for use between −40 degrees and 257 degrees Fahrenheit.

Another of the preferred materials is sold under the trade name "Por-A-Mold". Type S555 Por-A-Mold material has a Shore A durometer hardness of 50, an ultimate tensile strength of 415 psi, a modulus of 254 psi, elongation of 183%, and a water absorption of 1.4% after 7 days at 24 degrees Centigrade.

It will be noted that the shape of the preferred embodiment is adapted for easy removal from an injection mold. The smooth cylindrical sleeve section surfaces have no protrusions, such as ribs, to catch in mold recesses when the connector is removed. The staggered or stepped configuration, with monotonically increasing radii, has no axial overlaps of sleeve sections or shoulders.

The surface smoothness of the sleeve sections 20, 30, 40 and 50, besides facilitating mold removal, is an aspect of the present invention which increases the axial force needed to separate the pipes P and D. The friction of elastomers is not independent of the area; that is, overall effective friction increases with contact area. A connector structure with diminished area of contact between the sleeve sections and the pipes will decrease the holding force opposing the force tending to separate the connected pipes. For this reason, the present invention uses relatively large area cylindrical contact surfaces to grasp the pipes P and D, rather than ribs that diminish the contact area and the blow-out protection.

A second aspect of the invention, which also increases the force opposing separation, is the length of the sleeve sections 20, 30, 40, 50. The sleeve section diameters are determined by the standardized diameters of the pipes P, D. To increase the contact area and the holding force, the sleeve section lengths must be increased. It might be expected that the friction force of a section sleeve would increase in proportion to its length. However, the ratio of length to diameter of each of the sleeves 20, 30, 40, 50 has a non-linear effect upon the holding force; that is, doubling the sleeve length more than doubles the holding force of the tube on the pipe. Consider the following:

As a rod is longitudinally stretched (strained) it tends to decrease in diameter; the amount of decrease depends upon the rod material. Similarly, a hollow tube of flexible material decreases in internal diameter when stretched. If the tube closely surrounds and engages a pipe, it more tightly grips the pipe as the tube is stretched. Assume that a tube of elastomeric material has one end (i.e., an engaged end) placed over an end of a rigid pipe, with the engaged end of the tube extending some distance along the pipe. An axial force, tending to pull the tube off of the pipe, is then exerted at the free end of the tube. Consider in this situation, an axially short annular ultimate end segment at the very end of the engaged tube end. It is not stretched longitudinally at all because, unlike all the other annular segments, this ultimate end segment is attached to the rest of the tube only along one end. This means that there is no tension in the ultimate end segment, since any tension force exerted by the adjoining penultimate segment would be unbalanced and cause the ultimate end segment to move. If the ultimate end segment is stationary, the longitudinal tension at the very end must be zero. (The ultimate end segment may of course have circumferential tension, just like a thin rubber band stretched around the pipe.) The separating force exerted on the tube must decrease from some maximum force at a location even with the pipe end to zero force at the ultimate end segment. As the longitudinal tension increases with distance from the tube end, so the longitudinal strain (stretch) increases; as the strain increases, the diameter decreases; as the diameter decreases, the grip of the tube on the pipe increases. In sum, the gripping force acting to oppose separation, increases with distance from the tube end. It follows that the total holding force (i.e., the sum of the gripping forces of all the annular segments of the tube in contact with the pipe) increases as a function of the length of tube engaging the pipe. The precise function depends on the coefficient of friction, the interference between the tube inner diameter and pipe outer diameter, and the elasticity of the tube. In all cases, the increase of holding force with length can be expected to be exponential, rather than linear.

It is a matter of common experience that the difficulty of moving a resilient tube onto or off of a rigid pipe increases greatly with the engagement length; for example, when pushing rubber tubing onto a glass pipe.

A contacting surface with ribs on the other hand, does not show the same generally exponential increase of force with length as do the smooth-walled cylindrical sleeve sections employed in the present invention. Ribs are thicker and hence stiffer than the rest of the tube, both longitudinally and circumferentially. A ribbed tube acts more like a series of rigid rings connected by springs, and the above analysis will apply to each rib; since each rib is axially short, the force in any one stays small.

In the present invention, the generally exponential increase in holding force with length of tube is used to advantage; sleeve sections 20, 30, 40, of the connector 10 each has an engagement length-to-radius ratio greater than one. In the preferred embodiment, the ratios range from 1.36 to 1.91. The result is greater frictional engagement. The ratio for sleeve section 50 is 0.80; this sleeve, in an alternate embodiment, may be made 0.20 inches longer to also reach the ratio of one. The holding force of sleeve section 50 adds to that of the sleeve section 40 (since both grip pipe D) so it may, depending on other variables, be made shorter than the pipe radius of 0.938 inches (as it is in the illustrated embodiment) without adversely affecting the performance of the present invention.

A third important aspect of the present invention lies in the relations between the wall thicknesses of the connector 10, the number of sleeve sections, and the gap between the outside of the hose pipe P and the inside of the drain pipe D (i.e., the difference of the drain pipe inside radius and the hose pipe outside radius).

It will be seen, when looking at FIG. 2, that the sleeve sections 20, 30 and 40, if made of rigid material and unconnected by bridges, would slide closely within one another in the manner of an old-fashioned telescope. By calculating from the dimensions of the preferred embodiment as set forth above, one finds that there would be a radial clearance of 0.0255 inches between sleeve section 40 and sleeve section 30, and a radial clearance of 0.0400 inches between sleeve sections 20 and 30. The sum of these radial clearances is 0.0655 inches.

In actuality the sleeve sections 20, 30, 40 are not rigid and they are connected by shoulders 23, 34. When a separating force tends to blow hose pipe P out from drain pipe D, the sleeve sections of the connector 10 tend to roll over and become wedged between pipe P and tube D in the manner illustrated in FIG. 3. The radial gap between pipes P and D, when they are coaxially aligned, is 0.025 inches. If the 0.075-thick wall of sleeve section 20 rolls over, there is a sandwich of thickness 0.062 +0.075 +0.075 =0.212 inches. This results in greater resistance to further separation because the fold at the rollover point and the shoulder 23 are both thicker than the walls themselves, and effectively close up the 0.038-inch theoretical clearance. The walls of the connector 10 rub against each other once rollover starts. Since rubbery materials have very large friction coefficients, often greater than 1.0, the friction is greatly increased, as is the holding force of the connector 10.

If the fold of sleeve section 20 somehow reaches the bottom of sleeve section 40, another wall rolls over. At this point there is not enough room between the pipes for the sleeve section walls, much less the wedged folds and shoulders. The pipe P thus becomes firmly jammed.

A sudden inrush of water to the confined space within pipe D causes a build up of pressure pushing against the outside surface of sleeve section 20. The resulting increased friction between the inside of sleeve section 20 and the outside of hose pipe P prevents sliding of pipe P within sleeve 20. Rolling and jamming as described above results when the washing machine forcefully ejects water from hose H.

When the washing machine pump is stopped, normal atmospheric pressure is restored in drain pipe D, allowing pipe P to be withdrawn by sliding it through sleeve section 20. Withdrawal is facilitated if pipe P is rotated while being axially removed.

It is to be noted that the possibility of rolling and wedging in the present invention depends upon the sleeve sections having lengths significantly greater than their wall thicknesses. A wall that is thick in proportion to the sleeve section length tends to twist and slide instead of rolling.

It is also to be noted that ribs disposed on the sleeve section interior would interfere with the jamming action as described above, since rolling could not occur if the ribs were to lock together.

It will be seen that the present invention will effectively couple not only rigid pipes, but also non-rigid pipes having enough stiffness to not collapse under the grip of the connector sleeve sections. In particular, a washing machine hose alone tends to be stiff enough to be gripped by the sleeve sections 20 or 30.

Having described a preferred embodiment of a pipe connector in accordance with the present invention, it is believed that other modifications, variations, and changes will be suggested to those skilled in the art in view of the teachings set forth herein. It is therefore to be understood that all such variations, modifications, and changes are believed to fall within the scope of the present invention as defined by the appended claims.

What is claimed is:

1. A connector of pliable rubbery material for coupling a large pipe to a small pipe, the large pipe having an inner diameter greater than an outer diameter of the small pipe, the large pipe and the small pipe coaxially overlapping when coupled by said connector, said connector comprising:
   a mutually coaxial plurality of right cylindrical smooth-walled sleeve sections each being of substantially identical uniform thickness and each having unique sleeve radius throughout its axial length, each one of said sleeve sections being joined at a respective sleeve end to another one of said sleeve sections to form a staggered configuration of said sleeve sections, said staggered configuration having a sequence of increasing sleeve radii; and
   annular shoulders joining said sleeve sections to form said staggered configuration;
   wherein when the small pipe is inserted coaxially into the large pipe and coupled thereto by said connector, one of said sleeve sections has an outside diameter dimensioned for gripping an interior surface of the large pipe by circumferential tension and compression of the rubbery material, and another of said sleeve sections has an inside diameter dimensioned for gripping an exterior surface of the small pipe by circumferential tension and compression of the rubbery material.

2. The connector according to claim 1, wherein said staggered configuration is a stepwise configuration of said sleeve section.

3. The connector according to claim 2, wherein each sleeve section of said stepwise configuration has a respective axial sleeve length greater than its said sleeve radius.

4. The connector according to claim 2, wherein at least one of said sleeve sections has an internal diameter of approximately 1.05 inches.

5. The connector according to claim 2, wherein at least one of said sleeve sections has an internal diameter of approximately 1.30 inches.

6. The connector according to claim 2, wherein a circumferentially largest sleeve section is folded back over a next adjacent sleeve section of the staggered configuration to define an annular space therebetween for accepting an end section of the large pipe therewithin.

7. The connector according to claim 6, wherein said largest sleeve section has an internal radius approximately equal to 0.94 inches and said next adjacent sleeve section has an external radius of approximately 0.74 inches.

8. The connector according to claim 6, wherein said largest-diameter sleeve section has a largest-sleeve axial length equal to at least 0.8 times the internal radius.

9. The connector according to claim 8, wherein each sleeve section of said stepwise configuration has a respective sleeve length greater than a respective said sleeve radius.

10. The connector according to claim 1, wherein the rubbery material has pliability greater than that indicated by a Shore A durometer rating of 75.

11. The connector according to claim 1, wherein each one of said plurality of sleeve section has a respective sleeve wall thickness substantially less than a respective sleeve length.

12. The connector according to claim 11 wherein a sum of said sleeve wall thicknesses of all of said sleeve sections, disposed between the small pipe and the large pipe in an overlapping region defined when the small pipe is inserted coaxially into the large pipe and coupled thereto by said connector, is substantially equal to a difference between the large pipe inner radius and the small pipe outer radius, whereby, the sleeve walls may wedge into space between the pipes to prevent decoupling of the large pipe and the small pipe.

13. The connector according to claim 1 wherein the small pipe is a drain pipe from a washing machine, and said large pipe is an inlet to a sewer line.

* * * * *